Patented Oct. 5, 1926.

1,602,243

UNITED STATES PATENT OFFICE.

CLYDE NAGLE, OF ELMIRA, NEW YORK.

MULTIPLE-DRILLING ATTACHMENT.

Application filed April 26, 1924. Serial No. 709,272.

This invention relates to boring or drilling devices and has for its object the provision of a novel device designed for use in a turret or other lathe for the purpose of drilling holes in work carried by the face plate or chuck of the lathe.

An important object is the provision of a device of this character which is so constructed and arranged as to drill a plurality of holes at the same time thereby saving in time and labor especially as it is unnecessary to remove the work from the lathe and carry it to a drill press.

An additional object is the provision of a device of this character which will be simple and inexpensive in manufacture, easy to use, positive and rapid in action, efficient and durable in service and a general improvement in the art.

With the above and other objects and advantages in view the invention consists in the details of construction to be hereinafter more fully described and claimed and illustrated in the accompanying drawings, in which:—

Figure 1 is a longitudinal section through the device showing it in the act of drilling work carried by a lathe face plate, Figure 2 is a section on the line 2—2 of Figure 1.

Referring more particularly to the drawings the letter A designates a face plate or chuck of a lathe carrying the work B which is to be drilled.

In carrying out the present invention I provide a body member 10 of suitable size, shape and material having an outstanding flange 11 formed with holes 12 whereby it may be bolted onto the turret or other suitable portion of a lathe. The outer face of this body is formed with a flange 13 which projects outwardly and which is recessed at 14 for the accommodation of a ring gear 15 which is secured by studs 16 and which is consequently held stationary with the body 10.

Disposed against the outer face of the body 10, or bearing against the flange 13 thereof is a rotatable body 17 pivoted with respect to the body 10 by a spindle bolt 18 which is screwed into a central hole 19 in the body 10 and which has a smooth portion fitting within a bushing 20 in the center of the body member 17. The members 10 and 17 are held together by a nut 21 screwed onto the spindle bolt and bearing against suitable washers 22. At opposite sides the body member 17 is formed with extensions 23 having bores 24 engaged upon the reduced ends 25 of guides 26 which are slidable through guide passages 27 in the face plate A so that the body 17 will rotate with the face plate while being capable of movement toward or from the same.

At diametrically opposite points, the body 17 is formed with bores 28 within which are bushings 29 through which are rotatable sockets 30 having reduced extensions 31 carrying pinions 32 which mesh with the ring gear 15. Thrust bearings 33 of the ball bearing type are located against these pinions and bear against a ring 34 located within an annular recess 35 in the outer face of the body 10. Any suitable drills 36 are mounted within the sockets 30.

In the operation, it will be seen that when the member 10 is held stationary and the work B rotated by the face plate, the body 17 will likewise be rotated whereupon the pinions 32 traveling in mesh with the ring gear 15 will be rotated, thereby rotating the sockets and drills and boring holes in the work.

While I have shown and described the preferred embodiment of my invention it is of course to be understood that I reserve the right to make such changes in the form, construction and arrangement of parts as will not depart from the spirit of the invention or the scope of the subjoined claim.

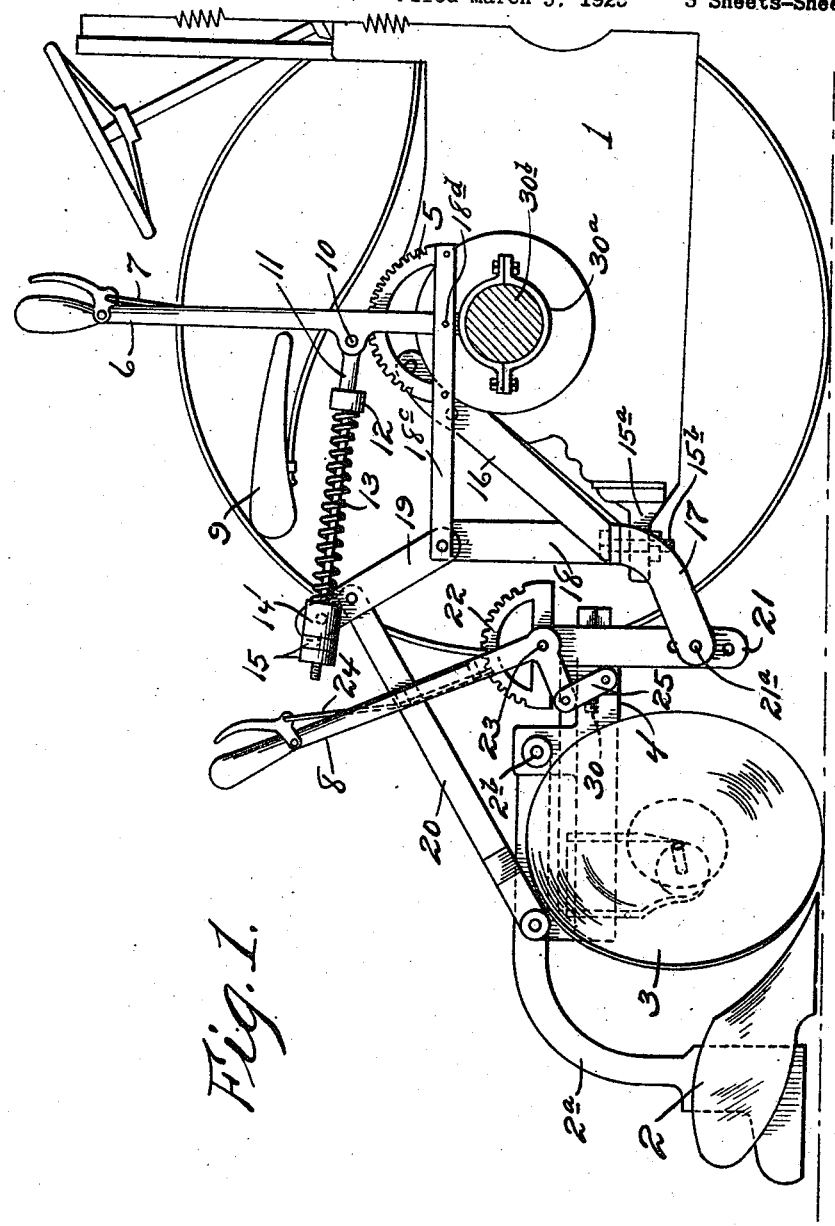

I claim:—

In combination with the face plate of a turret lathe, a body member adapted to be stationarily mounted with respect to the turret and formed with a recess, a ring gear mounted within the recess, a second body member rotatable with respect to the face plate, securing members passing through the second named body and into said ring gear, said rotatable body being formed with openings, socket members rotatably mounted within said openings and constituting chucks for holding drills, pinions on said socket members meshing with said ring gear, means securing the second named body member with respect to the face plate of the lathe, and thrust bearing members recessed into the first named body member and bearing against the pinions.

In testimony whereof I affix my signature.

CLYDE NAGLE.